(12) United States Patent
Melpignano

(10) Patent No.: US 7,193,989 B2
(45) Date of Patent: Mar. 20, 2007

(54) RADIO COMMUNICATION ARRANGEMENTS

(75) Inventor: Diego Melpignano, Monza (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 1000 days.

(21) Appl. No.: 10/135,337

(22) Filed: Apr. 30, 2002

(65) Prior Publication Data

US 2002/0176445 A1     Nov. 28, 2002

(30) Foreign Application Priority Data

| May 1, 2001 | (EP) | ................................. | 01201614 |
| May 9, 2001 | (EP) | ................................. | 01201698 |
| Jan. 9, 2002 | (EP) | ................................. | 02075080 |

(51) Int. Cl.
*H04J 3/06* (2006.01)

(52) U.S. Cl. .................................................. 370/350

(58) Field of Classification Search ................ 370/338, 370/349, 350, 503
See application file for complete search history.

(56) References Cited

U.S. PATENT DOCUMENTS 5,940,431 A     8/1999     Haartsen et al. ............ 375/202
6,574,266 B1 *  6/2003     Haartsen ....................... 375/133
6,718,395 B1 *  4/2004     Ziegler ......................... 709/248

FOREIGN PATENT DOCUMENTS

WO          0120940 A1      9/2000

OTHER PUBLICATIONS

"Specification of the Bluetooth System". Bluetooth. Version 1.1 Feb. 22, 2001, pp. 287-288.*
"Bluetooth Specification Version 1.1" Bluetooth, 'Online! Feb. 22, 2001, pp. 96-99.

* cited by examiner

*Primary Examiner*—Derrick W. Ferris
(74) *Attorney, Agent, or Firm*—Paul Im

(57) ABSTRACT

A communications arrangement 10 is disclosed which comprises first and second communications devices MT, AP, said first device MT being adapted to enter into a page scan state in which it is receptive to transmissions on a particular page scan frequency $f_{ps}$ and said second device AP being adapted to transmit a page train A which is centered around an estimate of said page scan frequency $f_{ps}$. The arrangement is characterized in that in that, under predetermined circumstances following prior communication between said devices MT, AP, said second device AP is adapted to transmit a page train A' which has been modified to start on a frequency f(k) shifted to correspond to said estimate and preferably also truncated to avoid transmission of at least one predetermined frequency sub-train $A_2$ of the original page train A.

27 Claims, 3 Drawing Sheets

RADIO COMMUNICATION ARRANGEMENTS

The present invention relates to radio communications arrangements and in particular to the establishment of a connection between communication devices in a telecommunications network such as a local area network (LAN).

A current implementation of the above type in the form of a short range wireless based personal area network (PAN) is known in the art as "Bluetooth" (™) communications, which is controlled by the Bluetooth standard. A full specification for Bluetooth communications can be found through the Bluetooth Special Interests Group (SIG), whose web site can be found at "www.bluetooth.com" along with the current standard and related information.

A useful discussion of Bluetooth communications can be found in text book form in "Bluetooth, Connect Without Wires" by Jennifer Bray and Charles F Sturman, published by Prentice Hall PTR under ISBN 0-13-089840-6.

Further prior art can be found in, for example, WO 01/20940, U.S. Pat. No. 5,940,431 and in US published applications 2001/0005368A1 and 2001/0033601A1, in which some aspects of the current state of the art in this field are also discussed.

The reader is referred to the above mentioned sources for general Bluetooth background information and also, for example, for clarification of terms of art used herein and not specifically covered by the abbreviations defined below.

There are two main states that a Bluetooth module/device can be in, referred to in the art as "Standby" and "Connection". The standby state is the default state in which a Bluetooth device has no links with other devices. In order to establish a link with another Bluetooth device and achieve the connected state, two procedures must be executed sequentially and these are referred to as "Inquiry" and "Page".

Any device may issue an inquiry message and the inquiry phase is used to obtain the address of a potential master or slave unit, the address being referred to as the Device Access Code (DAC). The inquiry procedure does not establish a connection between devices, only the page procedure can do this. The inquiry procedure identifies potential candidates for connection and gathers their addresses. Once a device knows the DAC of a further device, obtained by for example the inquiry procedure, it can page that device. If the paging is successful, the pager and the paged device will enter into the connected state.

In the inquiry procedure, the inquiring device issues an inquiry message containing a General Inquiry Access Code (GIAC) or a number of optional Dedicated Inquiry Access Codes (DIAC). The message is repeated at several levels, firstly in an inquiry train referred to as "inquiry train A" which is made up of the transmission of a single inquiry train on sixteen frequencies from a total of thirty-two, centered around f(k) which represents the inquiry hopping sequence.

The message is sent twice on two frequencies in one Bluetooth timeslot and the following timeslot is used to listen for replies on the two corresponding inquiry response hopping frequencies. Sixteen inquiry frequencies and their response counterparts can therefore be covered in sixteen timeslots, i.e. 10 mS. This inquiry train A is repeated at least $N_{inquiry}$ times, which means at least 256 repetitions of the entire train. If voice links (SCO) are active, then this number can be doubled or tripled because the priority given to SCO links means that the inquiry transmissions will be interrupted and $N_{inquiry}$ must increase to compensate.

The inquiry train A is then swapped for a further inquiry train B, consisting of the remaining sixteen frequencies and the cycle is repeated. The current Bluetooth standard calls for this switch between inquiry trains A and B to take place at least three times so as to ensure the collection of all responses in a substantially error free environment. The result of this call for repetition is that an inquiry broadcast could take at least 10.24 seconds.

A device which wants to be discovered enters an "inquiry scan" state, in which it listens for a message containing a GIAC or DIAC of interest. It too operates in a cyclic way, by listening on a single hop frequency for an inquiry scan period known as $T_{w\_inquiry\_scan}$. This must be long enough to cover the sixteen frequencies used by the inquiry procedure. With no other activity, sixteen Bluetooth timeslots should be sufficient, although the presence of SCO links may necessitate longer scan periods.

The frequency chosen for the inquiry scan comes from the list of thirty-two frequencies making up the inquiry hopping sequence. These frequencies are determined by the GIAC and the phase within the sequence dictated by the unit's own clock. The phase and therefore also the frequency will change every 1.28 seconds.

On hearing an inquiry containing an appropriate IAC, the device seeking to be found enters the "inquiry response" substate. At this stage there is the danger of contention, although the chances of two or more receivers hearing the inquiry message at the same instance is reduced because it is unlikely that they will be in the same phase in their respective hopping sequences. In order to safeguard against the, albeit low, possibility of contention that remains, a random back-off procedure is used, in which the device concerned generates a random number (RAND) between 0 and 1023 and returns to the connection or standby states for at least RAND timeslots. After this, it re-enters the inquiry response substate and listens. If it then receives an inquiry message, it can respond immediately with a frequency hop synchronization (FHS) packet containing information about itself, including its device address. In 1.28 seconds, the device can send its FHS packet an average of four times, the average delay from RAND being typically 511 timeslots or 0.32 seconds.

The inquirer uses two sets of sixteen frequencies, i.e. inquiry trains A and B. If it is assumed for the moment that the to-be-discovered device is monitoring on an inquiry train B frequency, then it must wait 2.56 seconds while the inquirer scans with train A. If SCO links are active and the recommendations of the current Bluetooth specification are adhered to, it may prove necessary to wait for 5.12 or even 7.68 seconds. If an inquirer completes the three full inquiry train switches, these assumptions could all become irrelevant. An inquiry scan can be assumed to last for at least 10.24 seconds, longer if SCO links are present.

Once the inquiry procedure has been completed, the paging procedure can start in order to establish a link between the paging and the paged devices. The paging procedure can be considered to be more efficient than the inquiry procedure for two reasons. Firstly, the inquiring device is aware at least roughly of the hopping sequence of the paged device. Secondly, the procedure is not open ended and stops as soon as the single target device has been contacted. This is unlike inquiry, which has for example to deal with potentially many slaves and can last for quite a long period.

In the page procedure, one device initiates paging by moving its link manager into the "paging" state and this device becomes the master unit. In similar fashion to the inquiry state, there are two page trains transmitted on sixteen frequencies (f{k−8} to f{k+7}). Again, two are transmitted in each second Bluetooth timeslot, thus requiring at least sixteen timeslots (i.e. 10 mS) to complete. The frequencies used come from a slave specific pool of 32 frequencies that are arranged every 1.28 seconds and the transmitted data is again an ID packet.

The reason for the use of two separate page trains in the page state will now be discussed in brief. The master unit was previously informed during the inquiry procedure of the value of the slave's clock and knows the lower part of the slave address, which is what is being used to calculate the hopping sequence. The master can therefore attempt to calculate which frequency the slave is currently transmitting on. There may be an error in this calculation if the two clocks are not running at the same speed, which is quite likely when it is remembered that the Bluetooth clocks are free-running and unsynchronized.

The first page train A used in the paging procedure operates on the sixteen frequencies which surround the expected page scan frequency of the paged device. If this doesn't work, then the second page train B is tried, which contains the other sixteen frequencies. Each page train A, B must be repeated more than once if any SCO channels are operating.

Whenever the page and page scan sequences coincide, the paged device should receive the ID packet from the paging device. At this stage, the paged device immediately acknowledges with another ID packet of its own. If the paging device receives the second packet from the paged device, both parties will be in short "page response" states. There is one for the master and one for the slave, but both use the same clock, frozen at the time of successful ID exchange. This freezing takes account of the fact that the actual value of the slave's clock and the master's estimate of the value of the same clock may not always exactly coincide. They both just step through the hopping sequence one at a time, so that they can be sure they are working together. During this response state, the master sends its accurate timing information in a frequency hop synchronization (FHS) packet, which should be acknowledged by the slave with another ID packet. All the required information has been exchanged and the pager and the paged device move into the connection state using the same extended pseudo-random hopping sequence, which has a period in the order of one day. Analysis of paging times can be carried out in a similar fashion to that used for the inquiry procedure. Complications may again lie in the chosen interval and duration for both the page and page scan states. The page state is usually continuous once it has been entered, but its duration will depend on the behavior of the device it is trying to contact. The page scan state of the target device may vary by quite a lot.

The interval between successive scans is described using three modes. If scanning is continuous, it is referred to as mode R0. Mode R1 is for any periodic scan with an interval between scans of less than 1.28 mS. Mode R2 is for an interval of between 1.28 seconds and 2.56 seconds (the maximum interval). This interval is referred to as $T_{page\_scan}$. The R0 mode provides the quickest connection, although an average scanning interval of up to 2.56 seconds may be expected.

Adding the time taken for inquiry to that for paging could give a total of 12.80 seconds before entering into the connection state. Under certain circumstances, such an interval may prove inconvenient as the two terminals attempting to make contact may no longer be in range. In addition, if a master terminal is besieged with multiple demands for connection of slave devices, it might prove unreasonable to expect those slave devices to wait while a succession of connections was created using such a lengthy procedure. It is therefore desirable to seek arrangements in which the time take to establish a connection between a paging device and a paged device may be reduced in comparison to using the standard page trains A, B.

It is an object of the present invention to provide an improved radio communications arrangement and method of operating the same.

It is a further object of the present invention to provide an improved arrangement for the establishment of a connection between wireless communication devices in a network such as a local area network (LAN), a wide area network (WAN), a personal area network (PAN) or a controller area network (CAN). The network may use spread spectrum techniques to improve transmission reception quality and well accepted forms of spread spectrum techniques include fast or slow frequency hopping and direct sequence spread spectrum, fast frequency hopping being considered as a technique in which the frequency changes more quickly than the modulation rate.

Accordingly, the present invention provides a communications arrangement comprising first and second communications devices, said first device being adapted to enter into a page scan state in which it is receptive to transmissions on a particular page scan frequency and said second device being adapted to transmit a page train which is centered around an estimate of said page scan frequency, characterized in that, under predetermined circumstances following prior communication between said devices, said second device is adapted to transmit a page train which has been modified to start on a frequency shifted to correspond to said estimate. Said first and second communications devices may comprise access points and mobile terminals or mobile terminals and access points respectively of said arrangement and said arrangement may be adapted for operation in accordance with the Bluetooth standard.

Said predetermined circumstances may include a consideration of a time lapse between said prior communication and the transmission of said modified page train. Said prior communication may comprise a response to an inquiry procedure executed between said devices. Said prior communication may have been terminated by a communications link failure.

Said modified page train may be truncated. Said modified page train may be truncated by said second device setting a page time-out which ensures that a second frequency subtrain of said page train is not transmitted. Said page-time out may be set before said modified page train is transmitted.

Said page scan frequency may be shifted on the basis of at least one of clock offset information and a network address relating to said first device.

Said first device may comprise a master unit in a set of master units and said second device may comprise a slave unit, said modified page train comprising part of a series of page trains used by said slave unit to page a plurality of master units in said set. Said series of page trains may comprise page trains respectively modified such that each starts on an estimate of the page scan frequency of one of said plurality of master units being paged.

Said first device may comprise a slave unit amongst a plurality of slave units and said second device may comprise a master unit, said modified page train comprising part of a series of page trains used by said master unit to page a plurality of said slave units sequentially, each said page train in said series being modified such that it starts on an estimate of the respective page scan frequency of a slave unit in said series.

Each said modified page train may be truncated such that a respective frequency sub-train thereof is not transmitted. Said sequential paging may be used by said master unit to respond to multiple requests from slave units for handoffs.

The or each said modified page train may be used to attempt reconnection of a communications link previously in place between said devices.

The or each said first device may be adapted to enter into a continuous said page scan state on detection of a breakdown in said previously existing communications link.

The or each said first device may remain in said page scan state for at least a predetermined period to wait for a said page train. Said second device may attempt to reestablish said previously existing connection by repeating said modified page train a plurality of times.

The or each said second device may stop paging the or each said first device at the end of a page time-out event, said time-out preferable being settable by or in the or each said second device.

The arrangement may include determining, from reception or not of responses to said modified page train from the or each said first device, whether or not the or each said first device is within communications range of said second device.

The present invention also provides a communications device for use in an arrangement according to any preceding claim, wherein said communications device is adapted to page at least one further communications device using a page train centered around a page scan frequency of said further communications device, wherein, under predetermined circumstances following prior communication between said devices, said communications device is adapted to transmit a page train which has been modified to start on a frequency shifted to correspond to said estimate.

Said predetermined circumstances may include a consideration of a time lapse between said prior communication and the transmission of said modified page train.

Said prior communication may comprise a response to an inquiry procedure executed between said device and a said further device.

Said prior communication may have been terminated by a communications link failure.

Said modified page train may be truncated. Said modified page train may be truncated by said device setting a page time-out which ensures that a second frequency sub-train of said page train is not transmitted. Said page-time out may be set before said modified page train is transmitted. Said page scan frequency may be estimated from at least one of clock offset information and a network address relating to said further device. Said device may comprise an access point or a mobile terminal of a Bluetooth arrangement.

The present invention also provides a method of operating a communications arrangement comprising first and second communications devices, said first device being adapted to enter into a page scan state in which it is receptive to transmissions on a particular page scan frequency and said second device being adapted to transmit a page train centered around an estimate of said page scan frequency of said first device, the method including said second device transmitting, under predetermined circumstances following prior communication between said devices, a page train which has been modified to start on a frequency shifted to correspond to said estimate.

The method may include truncating said modified page train. Truncating said modified page train may be performed by setting a page time-out which ensures that a frequency sub-train of said page train is not transmitted.

The method may include estimating said page scan frequency on the basis of at least one of a clock offset and an address of said first device. The method may be used for handing off said first device from said second device to a further device. The method may be used for re-establishing a lost connection between said devices. The method may be used by said second device to establish connections with multiple said first devices.

Said communications arrangement may comprise a Bluetooth arrangement and the or each said first and second devices respectively may comprise access points and mobile terminals or mobile terminals and access points thereof.

The present invention will now be described by way of example only and with reference to the accompanying drawings, in which.

Figure 1:
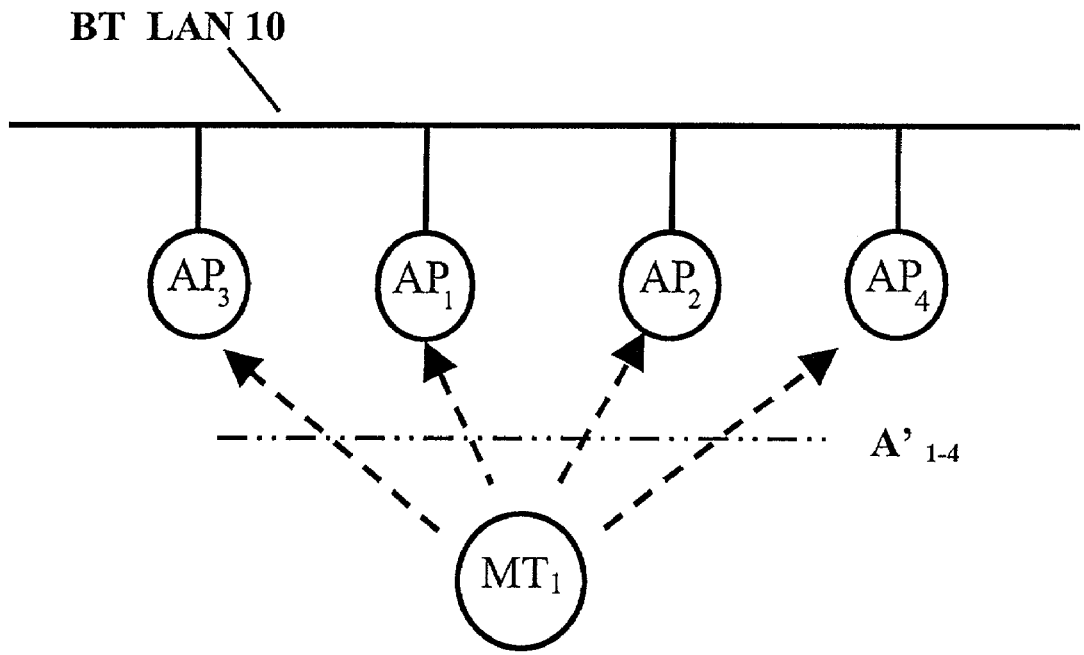
FIG. 1 is a schematic diagram of a first embodiment of the present invention.

The present invention will be described with reference to certain embodiments and drawings but the present invention is not limited thereto but only by the attached claims. Further, the present invention will be described mainly with reference to a local area network but is not limited thereto. The network may be any form of shared resource network (SRN), i.e. in an SRN hardware resources are shared, and each hardware network element can be accessed from any other network element. An SRN in accordance with the present invention is more-or-less synonymous with a CAN, LAN or WAN, but the term SRN will be used to indicate that the present invention is not limited to specific aspects of known CANs, WANs or LAN's e.g. contention scheme or whether Ethernet, Token Ring or Wireless LAN. In particular, the present invention relates to a PAN—a personal area network, involving short range radio connection between mobile units and master units. Also the topology of the PAN, LAN or WAN is not considered a limit on the present invention, e.g. bus physical, star physical, distributed star, ring physical, bus logical, ring logical may all be used as appropriate. Various standards have been produced for LAN's, e.g. IEEE 802.3, IEEE 802.4, IEEE 802.5, ANSI X3T9.5 (FDDI, I and II) any of which may find advantageous use with the present invention. LAN and WAN design and construction are discussed in detail in, for example, "Mastering Local Area Networks", by Christa Anderson and Mark Minasi, SYBEX Network Press, 1999 or "Data Communications, Computer networks and Open Systems", by Fred Halsall, Addison-Wiley, 1996. Various types of wireless LAN have been standardized or are in general use, e.g. the standards IEEE 802.11, IEEE 802.11HR (Spread Spectrum) and systems based on DECT, Bluetooth, HIPERLAN, Diffuse or point-to-point infra-red. Wireless LAN's are discussed in detail in "Wireless LAN's" by Jim Geier, Macmillan Technical Publishing, 1999.

The present invention will also be described with reference to the Bluetooth standard but the present invention is not limited thereto but may be advantageously used wherever a wireless communications system makes use of a page train equivalent to that described herein.

Referring to the figures, a communications system is arranged in accordance with the Bluetooth standard in the form of a local area network BT LAN 10. The system includes a series of master units in the form of access points $AP_{1-4}$ and one or more slave units, in the form of mobile terminals $MT_{1-n}$. The access points $AP_{1-4}$ and mobile terminals $MT_{1-n}$ are adapted to establish and maintain communications with each other in accordance with the Bluetooth standard.

All the embodiments of the present invention can be used with the Bluetooth protocol. The features of such a system may include one or more of:

Slow frequency hopping as a spread spectrum technique, i.e. the hopping rate is slower than the modulation rate;
Master and slave units, whereby the master unit can set the hopping sequence;
Each device has its own clock and its own address;
The hopping sequence of a master unit can be determined at least in part from its address;
A set of slave units communicating with one master all have the same hopping frequency (of the master) and form a piconet;
Piconets can be linked through common slave units to form a scatternet;
Time division multiplex transmissions between slave and master units;
Time division duplex transmissions between slaves and masters units;
Transmissions between slave and master units may be either synchronous or asynchronous;
Master units determine when slave units can transmit;
Slave units may only reply when addressed by a master unit;
The clocks are free-running;
Uncoordinated networks, especially those operating in the 2.4 GHz license-free ISM band;
A software stack to enable applications to find other Bluetooth devices in the area;
Other devices are found by a discovery procedure; and
At least hard hand-overs.

As discussed above, when one Bluetooth (BT) device meets another and needs to communicate with it, it usually performs two procedures:

1. inquiry, where information on the peer's address and clock is gathered; and
2. paging, which is the connection set-up that makes use of the information collected in the previous inquiry phase.

The device that performs paging often becomes the master of a newly formed piconet, while the device that is paged becomes the slave and hops according to the frequency pattern determined by the master's address and clock. It will be appreciated that this situation can be reversed, for example in a PAN scenario during access point probing, such that it is in fact a mobile terminal which is the paging device and one or more access points which are paged.

The BT clock is the value of a 28-bit counter fed by a free-running oscillator. Since the clock determines the phase of the frequency hopping pattern and all devices in a piconet must hop synchronously, a clock offset is added to each device's native clock to reconstruct the master's clock:

$$CLKEm = CLK_1 + CLK\_OFFSET_{m,1}.$$

It is essential to update the clock offsets periodically to compensate for clock drifts.

During the connection-establishment phase, the or each paged device listens at a fixed page scan frequency $f_{ps}$ that depends on its particular address and clock:

$$f_{ps} = f(BD\_ADDR_s, CLK_s)$$

The paging device uses the paged device's address and clock information to estimate $f_{ps} = f(k)$ and transmits a train of packets at different frequencies centered around f(k). This aspect is named in the Bluetooth standard as page trains A and B, as discussed above with only page train A being shown below:

$$A = \{f(k-8), \ldots, f(k), \ldots, f(k+7)\}$$

Figure 4:
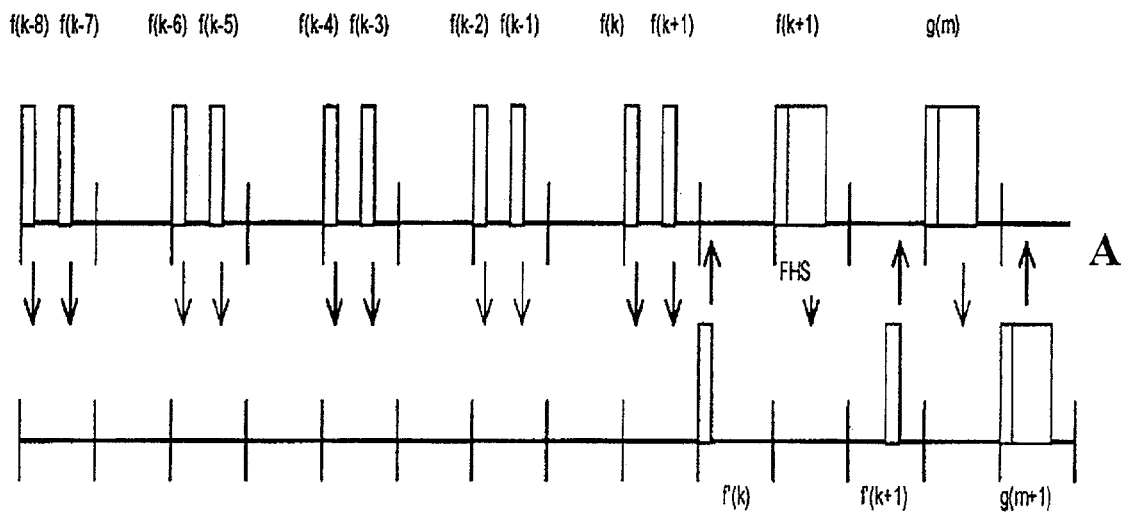
FIG. 4 is a graphical representation of a page train.

The reason for using this train of frequencies is that the clock information obtained by the paging device during the inquiry phase may no longer be accurate because of clock drifts, especially if a long time has passed since the paged device's response to inquiry was received. The standard A page train used in Bluetooth paging is depicted in FIG. 4. After the paged device has responded to the paging device, it synchronizes its clock to the pager's one using a Frequency Hop Synchronization (FHS) packet and then they start hopping together and exchanging data.

The paging procedure is activated when the Host Controller Interface (HCI) command 'HCI_Create_Connection' is sent to the Bluetooth module acting as the pager. Among its command parameters, BD_ADDR and Clock Offset represent the address of the device to be paged and its clock offset, respectively. If a response from the paged device is not received within a settable timeout (named Page_TO), the pager module returns an error event to its host.

In Personal Area Network (PAN) scenarios, a Bluetooth mobile terminal $MT_{1-n}$ accesses a local area network (LAN) through a set of access points $AP_{1-4}$ A list of candidate access points with updated timing information is periodically sent to the or each mobile terminal $MT_{1-n}$. So, if the connection with an access point $AP_{1-4}$ is lost, the or each affected mobile terminal $MT_{1-n}$ can try to establish new connections with access points $AP_{1-4}$ in the list, in sequence, and without using the time consuming inquiry procedure, which usually takes 10 seconds. This process is called access point probing and involves concatenated paging procedures until a connection with an access point $AP_{1-4}$ in proximity is successfully established. Such a situation is shown and discussed below with particular reference to FIG. 1.

In many cases, it is desirable to minimize the time one device $MT_{1-n}$, $AP_{1-4}$ spends paging another $AP_{1-4}$, $MT_{1-n}$. The present invention is based on using an assumption that, under predetermined circumstances, the timing information held by the paging device is an accurate representation of the page scan frequency $f_{ps}$ of the device to be paged. The circumstances include situations in which there has been prior communication between the paging and paged devices and, in particular, a consideration of a time lapse between that prior communication and the transmission of a modified page train. The assumption is particularly suited to situations in which only a short time has elapsed between an inquiry response (or a link failure) and the beginning of the paging procedure. Therefore the paging device can make a good estimate of the page scan frequency $f_{ps}$ the device being paged will use for listening to new connections.

The standard Bluetooth page train A can be represented as:

$$A = \{A_1, f(k), A_2\}$$

Where:

$$A_1 = \{f(k-8), \ldots, f(k-1)\}$$

and $$A_2 = \{f(k+1), \ldots, f(k+7)\}$$

If the standard page train A is used and the page scan frequency f(k) is known with sufficient accuracy, the time to transmit the first part of the page train A, i.e. sub-train $A_1$, is wasted. This which means that 8*625 μs=5 ms can be wasted for each paging instance by needlessly transmitting the first page sub-train $A_1$. In the same way, the final part of the train $A_2$ is not strictly necessary as, to reach f(k+1), f(k) will have been tried so a connection should already be underway. If it were possible to approach a page train frequency very close to f(k), it would be desirable to prevent transmission of the $A_2$ sub-train in addition to getting rid of the $A_1$ sub-train, thereby saving time before a next page train aimed at a further target paged device could be transmitted.

The present invention offers an improvement to the standard Bluetooth page train, based on two parts.

a) Firstly activating a paging procedure by passing a modified clock offset to the Bluetooth module of the paging device (whether that is an access point or a mobile terminal), such that the first frequency of the standard A-train, i.e. f(k−8), is frequency shifted to correspond to an estimate of the page scan frequency $f_{ps}$ of the paged device. In this manner the standard page train A is modified, such that no sub-train $A_1$ is transmitted and the modified page train starts on a frequency corresponding to this estimate of $f_{ps}$.

b) The second aspect to the modification of the standard page train A involves setting a short page timeout. The page train A is further modified beyond (a) above by truncation in such a manner that the modified page train A' actually transmitted does not include the $A_2$ sub-train, whose transmission is prevented by the truncation.

Steps (a) and (b) are repeated as many times as the number of devices to page or can involve the same device if necessary. Part (a) simply requires that the Bluetooth host in the paged terminal send a HCI_Create_Connection command to the module with a Clock_Offset that has been properly modified. Part (b) can be implemented by sending an HCI_Set_Page_Timeout with a low value before starting the sequence of paging procedures.

It can be assumed for the moment that, when the new paging procedure is activated, the paged devices are in continuous page scan mode, i.e. they are listening at ID packets generated by the paging device.

It has been shown that the new page train A' of the present invention is derived from modification of the standard Bluetooth A-train through a shift followed by a truncation. Therefore the new A' train can be expressed as:

$$A' = \{f(k), f(k+1)\}$$

The or each modified page train occupies a single BT timeslot slot and many of them can be concatenated by issuing consecutive HCI_Create_Connection commands, either towards the same or different paged devices, provided the appropriate timing information is available from, for example, recent communications. The Bluetooth module in the paging device receives a set of HCI_Create_Connection commands from the paged devices and puts them in a queue. As soon as one command from the queue has completed its execution, the corresponding HCI_command_complete event is sent back to the host and the next command in the queue is executed, until the command queue is empty.

If CLK_OFFSET is the clock offset between a paging and a paged device, in order to start paging with the new train A', a new CLK_OFFSET' must be passed to the paging module such that it can modify its standard $A_1$ sub-train:

$$f'(k-8) = f(k) = f_{ps}.$$

The relationship to derive CLK_OFFSET' can be found in the Annex below.

Figure 5:
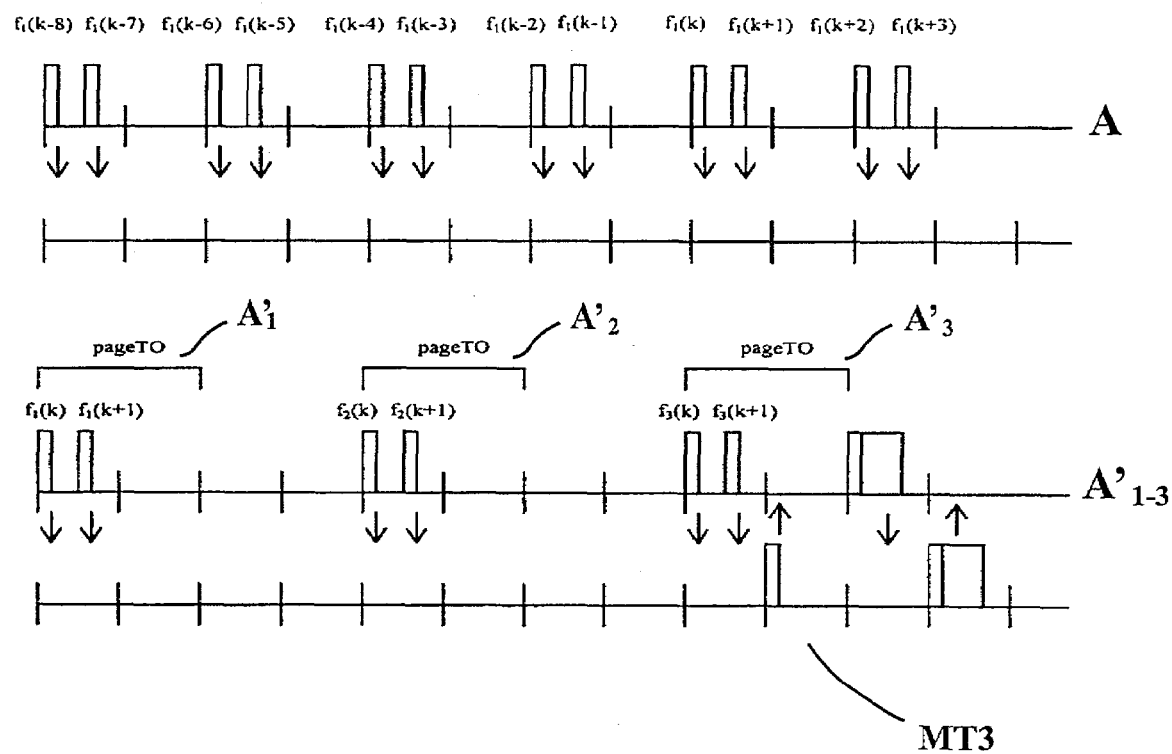
FIG. 5 is a comparison between using the page train of FIG. 4 and a modified version of the page train of FIG. 4.

FIG. 5 shows a comparison between using the standard paging procedure, page train A, and a repetition of modified page trains A' for probing three BT devices $MT_{1-3}$ among which by way of example only the third one $MT_3$ is in range. In the upper side of FIG. 5, the standard BT page train A is applied to try to connect to the three devices. Because of the length of the full page trains, only the page train towards the first device $MT_1$ is shown. In the lower part of FIG. 5, a truncated page train is transmitted three times, once each for each device to page/probe and modified respectively such that the first frequency of each modified page train A' corresponds to the estimated page scan frequency of the respective target paged devices $MT_{1-3}$. In each case, a page time-out (Page_TO) of two BT slots is set. As only the third paged device $MT_3$ is in range in this example, only it responds and the connection establishment continues in the standard way between that device and the paging device.

Each time the paging device starts paging with the suggested new procedure A', it can either receive an event that indicates that a connection has been established, or a page timeout event in cases where no response has been received within a time out comprising a settable number of BT timeslots (2 in the example).

Under the assumption that timing information is valid and that paged devices are all in page scan, the new method is noticeably faster than the standard one comprising one or both of standard BT page trains A, B, while still being compliant with the current Bluetooth specification (Version 1.1 at the filing date).

Three specific but non-limiting examples will now be discussed, so as to demonstrate how the principle of the present invention can be applied in practice.

Referring in particular for the moment to FIG. 1, a mobile terminal $MT_1$ is performing access point probing in a PAN scenario, in an attempt to connect with one of a plurality of candidate access points $AP_{1-4}$. The mobile terminal $MT_1$ sequentially pages each of the candidates $AP_{1-4}$ in its list using a succession of modified page trains $A'_{1-4}$ according to the frequency shifting and truncation of the present invention such that these modified page trains $A'_{1-4}$ each start on a frequency corresponding to an estimate of the respective page scan frequency $f_{ps-Ap-1-4}$ of the paged candidates $AP_{1-4}$. This situation is similar to that shown with particular reference to the lower part of FIG. 5 and time is saved in finding a suitable candidate for connection because the paging device $MT_1$ does not have to go through the process of transmitting either of the $A_1$ or $A_2$ sub-trains, as it might if it were to use the standard BT page train A. It can thus be seen that the present invention is particularly useful to BT devices entering an unknown environment where they need to establish one or more connections as quickly as possible.

Figure 2:
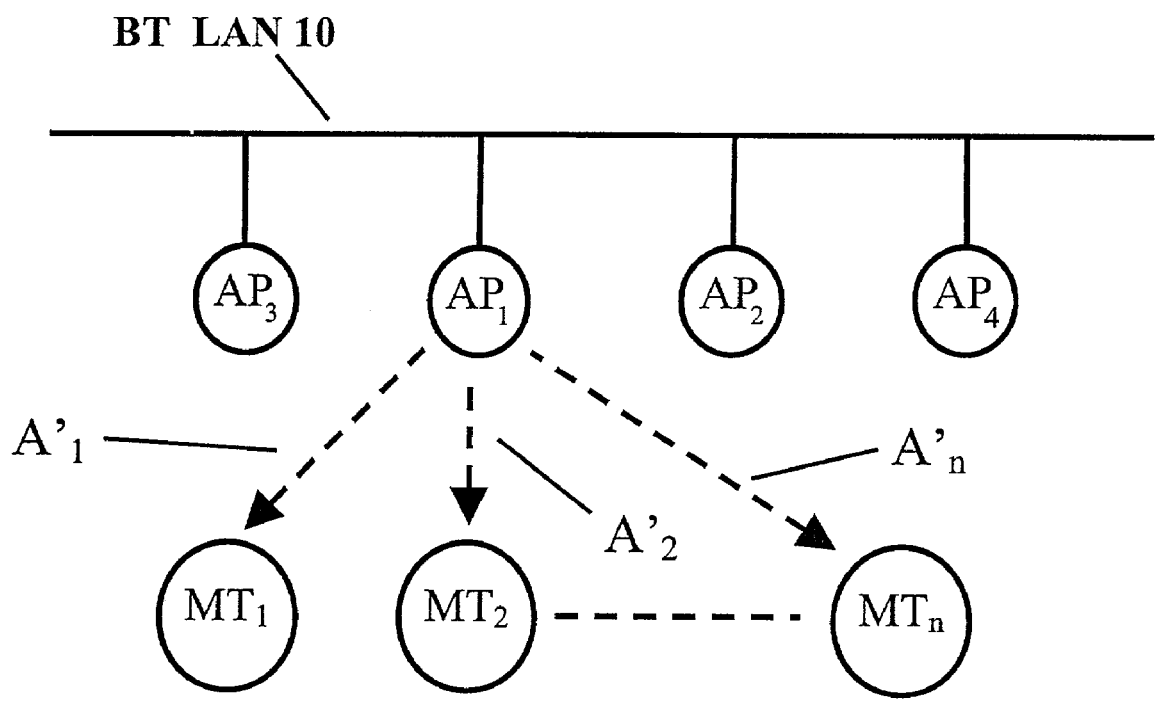
FIG. 2 is a schematic diagram of a second embodiment of the present invention.

Referring now in particular to FIG. 2, the present invention is also most useful for an access point $AP_1$ when it receives multiple requests from other devices such as mobile terminals $MT_{1-n}$ for connection, for example requests for hand-over/handoff to or from another access point. Under these circumstances, the access point $AP_1$ may well have to page many mobile terminals $MT_{1-n}$ in a short time. The sequential paging is performed using a succession of modified page trains $A'_{1-n}$ according to the frequency shifting and truncation of the present invention, in similar fashion to the way it is performed in the reverse direction with particular reference to the example given in relation to FIG. 2 above. The sequential paging here has two purposes: first to understand if the or each paged device $MT_{1-n}$ is really within the range of that particular access point $AP_1$; and secondly to establish a connection with the or each appropriate mobile terminal $MT_{1-n}$ so as for example to complete a handoff process.

Figure 3:
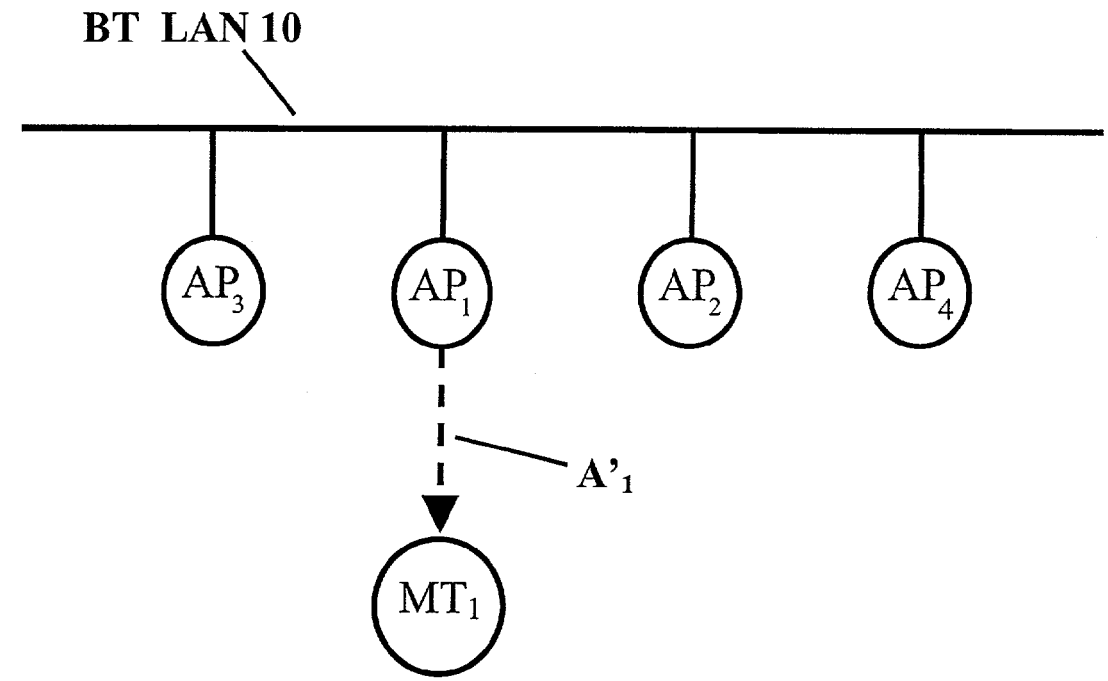
FIG. 3 is a schematic diagram of a third embodiment of the present invention.

Referring now in particular to FIG. 3, when two devices $AP_1$, $MT_1$ which were previously connected lose their connection, for example because one of them has temporarily moved out of range, the technique of the present invention can be applied to try to reestablish the existing link. In this case the mobile terminal $MT_1$, after detecting the link has dropped, immediately goes into a continuous page scan, waiting for its master access point $AP_1$ to reconnect. The access point $AP_1$, on the other hand, transmits a page train modified $A'_1$ in accordance with the present invention such that it starts on a frequency shifted to correspond to its last known estimate of the page scan frequency $f_{ps}$ of the mobile terminal $MT_1$ and such that it is truncated to prevent transmission of what would otherwise be the paging sub-train $A_2$ of the standard page train A described above. In this case, the modified page train $A'_1$ is only concerned with one particular mobile terminal $MT_1$ and the modified page train $A'$ can therefore be repeated in succession many times and much more quickly than would be possible using the full standard BT page train A. The modified page train can be used to specifically target the particular mobile terminal $MT_1$ several times in the time it would potentially take to establish a connection using the standard BT page train A. It will also be apparent that the mobile terminal $MT_1$ gets more chances at reconnection than it would in the same period if the paging device were to be using the standard BT page train A.

While the present invention has been particularly shown and described with respect to preferred embodiments, it will be understood by those skilled in the art that changes in form and detail may be made without departing from the scope and spirit of the invention.

Annex:

Clock offset derivation

The frequencies that determine the page trains A and B are derived with the following formula (see the Bluetooth spec. 1.1 page 135):

$$X_p^{(79)} = [CLKE_{16-12} + k_{offset} + (CLKE_{4-2,0} - CLKE_{16-12}) \bmod 16] \bmod 32$$

where:

$k_{offset} = 24$(page train $A$) or 8 (page train $B$)

and

CLKE is the paged device's estimated clock.

In order to shift the train A so that the first frequency in the train corresponds to the estimated slave's page scan frequency, we can modify $CLKE_{4-2,0}$ before passing it to the module with the HCI_Create Connection( ) Command.

This can be done by the following non-optimized pseudo-code, assuming a big-endian processor architecture:

UInt32 mask, clke, clke__420, clke_new_train;
mask=0x0000001d;
clke__420=clke & mask;
clke__420=(clke__420+16) & mask;
clke_new_train=(clke & ~mask) | clke__420;

where clke represents the estimated slave clock offset and clke_new_train is the new calculated value that must be used with the HCI_Create_Connection command in order to generate the page train A'.

The invention claimed is:

1. A communications arrangement comprising:
   a first communications device adapted to enter into a page scan state in which it is receptive to transmissions on a particular page sean frequency, and
   a second communications device adapted to transmit a page train for communicating with the first communications device, the page train being centered around an estimate of said page scan frequency, and under predetermined circumstances following prior communication between said devices, said second device is further adapted to truncate and modify the page train to start on a frequency shifted to correspond to said estimate.

2. An arrangement according to claim 1, wherein said predetermined circumstances include a consideration of a dine lapse between said prior communication and the transmission of said modified page train.

3. An arrangement according to claim 1, wherein said prior communication comprises a response to an inquiry procedure executed between said devices.

4. An arrangement according to claim 1, wherein said prior communication was terminated by a communications link failure.

5. An arrangement according to claim 1, wherein said modified page train is truncated by in said second device setting a page time-out which ensures that a second frequency sub-train of said page train is not transmitted.

6. An arrangement according to claim 1, wherein said page scan frequency is shifted on the basis of at least one of clock offset information and a network address relating to said first device.

7. An arrangement according to claim 1, wherein said first device comprises a master unit in a set of master units, and said second device comprises a slave unit, said modified page train comprising part of a series of page trains used by said slave unit to page a plurality of master units in said set and said series of page trains comprising page trains respectively modified such that each starts on an estimate of the page scan frequency of one of said plurality of master units being paged and said modified page trains being truncated such that a respective frequency sub-train thereof is not transmitted.

8. An arrangement according to claim 1, wherein said first device comprises a slave unit amongst a plurality of slave units and said second device comprises a master unit, said modified page train comprising part of a series of page trains used by said master unit to page a plurality of said slave units sequentially, each said page train in said series being modified such that it starts on an estimate of the respective page sean frequency of a slave unit in said series and each said modified page train being truncated such that a respective frequency sub-train thereof is not transmitted.

9. An arrangement according to claim 8, wherein said sequential paging is used by said master unit to respond to multiple requests from slave units for handoffs.

10. An arrangement according to claim 1, wherein the or each said modified page train is used to attempt reconnection of a communications link previously in place between said devices, the or each said first device being adapted to enter into a continuous said page scan state on detection of a breakdown in said previously existing communications link and to remain in said page scan state for at least a predetermined period to wait for a said page train.

11. An arrangement according to claim 1, wherein said second device attempts to re-establish said previously existing connection by repeating said modified page train a plurality of times.

12. An arrangement according to claim 1, wherein the or each said second device stops paging the or each said first device at the end of a page time-out event, said time-out being settable by or in the or each said second device.

13. An arrangement according to claim 1, including determining, from reception or not of responses to said modified page train from the or each said first device, whether or not the or each said first device is within communications range of said second device.

14. A communications device suitable for use in an arrangement according to claim 1, wherein said communications device is adapted to page at least one further communications device using a page train centered around an estimate of a page scan frequency of said further communications device, and under predetermined circumstances following prior communication between said devices, said communications device is further adapted to truncate and modify the page train to start on a frequency shifted to correspond to said estimate.

15. A device according to claim 14, wherein said predetermined circumstances include a consideration of a time lapse between said prior communication and the transmission of said modified page train.

16. A device according to claim 14, wherein said prior communication, comprises a response to an inquiry procedure executed between said device and a said further device.

17. A device according to claim 14, wherein said prior communication was terminated by a communications link failure.

18. A device according to claim 14, wherein said modified page train is truncated by said device setting a page time-out which ensures that a second frequency sub-train of said page train is not transmitted.

19. A device according to claim 14, wherein said page scan frequency is estimated from at least one of clock offset information and a network address relating to said further device.

20. A device according to claim 14, wherein said communications device comprises an access point or a mobile terminal of a Bluetooth arrangement.

21. A method of operating a communications arrangement comprising first and second communications, said first device being adapted to enter into a page scan state in which it is receptive to transmissions on a particular page scan frequency and said second device being adapted to transmit a page train communicating with the first device, the page train centered around an estimate of said page scan frequency of said first device, the method including said second device, under predetermined circumstances following prior communication between said devices, truncating and modifying the page train to start on a frequency shifted to correspond to said estimate.

22. A method according to claim 21, including truncating said modified page train by setting a page time-out which ensures that a frequency sub-train of said page train is not transmitted.

23. A method according to claim 21, including estimating said page scan frequency on the basis of at least one of a clock offset and an address of said first device.

24. A method according to claim 23, used for handing off said first device from said second device to a further device.

25. A method according to claim 24, used for re-establishing a lost connection between said devices.

26. A method according to claim 25, used by said second device to establish connections with multiple said first devices.

27. A method according to claim 26, said communications arrangement comprising a Bluetooth arrangement and the or each said first and second devices respectively comprising access points and mobile terminals or mobile terminals and access points thereof.

* * * * *